United States Patent [19]

O'Brien et al.

[11] Patent Number: 5,205,171

[45] Date of Patent: Apr. 27, 1993

[54] MINIATURE SILICON ACCELEROMETER AND METHOD

[75] Inventors: Benedict B. O'Brien, Manhattan Beach; Brent E. Burns, Torrance, both of Calif.; John A. Geen, Wrentham, Mass.

[73] Assignee: Northrop Corporation, Hawthorne, Calif.

[21] Appl. No.: 640,449

[22] Filed: Jan. 11, 1991

[51] Int. Cl.$^5$ .................... G01P 15/13; G01P 15/125
[52] U.S. Cl. ................... 73/517 B; 73/517 R
[58] Field of Search ................ 73/514, 517 B, 517 R

[56] References Cited

U.S. PATENT DOCUMENTS

| | | | |
|---|---|---|---|
| 3,062,059 | 11/1962 | Singleton | 73/517 B |
| 4,102,202 | 7/1978 | Feriss | 73/517 B |
| 4,336,718 | 6/1982 | Washburn | 73/517 B |
| 4,483,194 | 11/1984 | Rudolf | 73/517 B X |
| 4,584,885 | 4/1986 | Codwell | 73/517 B X |
| 4,679,434 | 7/1987 | Stewart | 73/517 B |
| 5,006,487 | 4/1991 | Stokes | 73/517 R X |
| 5,008,774 | 3/1991 | Bollis et al. | 73/517 R X |

Primary Examiner—Hezron E. Williams
Assistant Examiner—Michael Brock
Attorney, Agent, or Firm—Terry J. Anderson; Robert B. Block; Karl J. Hoch, Jr.

[57] ABSTRACT

A miniature accelerometer is fabricated using integrated circuit manufacturing and silicon micromachining techniques to form a closed loop, force balance sensor utilizing a silicon proofmass formed from and connected to a layer of silicon by a split flexure etched therein. The sensor circuitry detects AC signals coupled from the proofmass to a pair of electrodes formed on glass surfaces anodically bonded to the silicon layer. A DC restorative force is applied to the electrodes in response to the detected AC signals to balance acceleration forces applied to the proofmass. The sensor design is highly symmetrical.

22 Claims, 1 Drawing Sheet

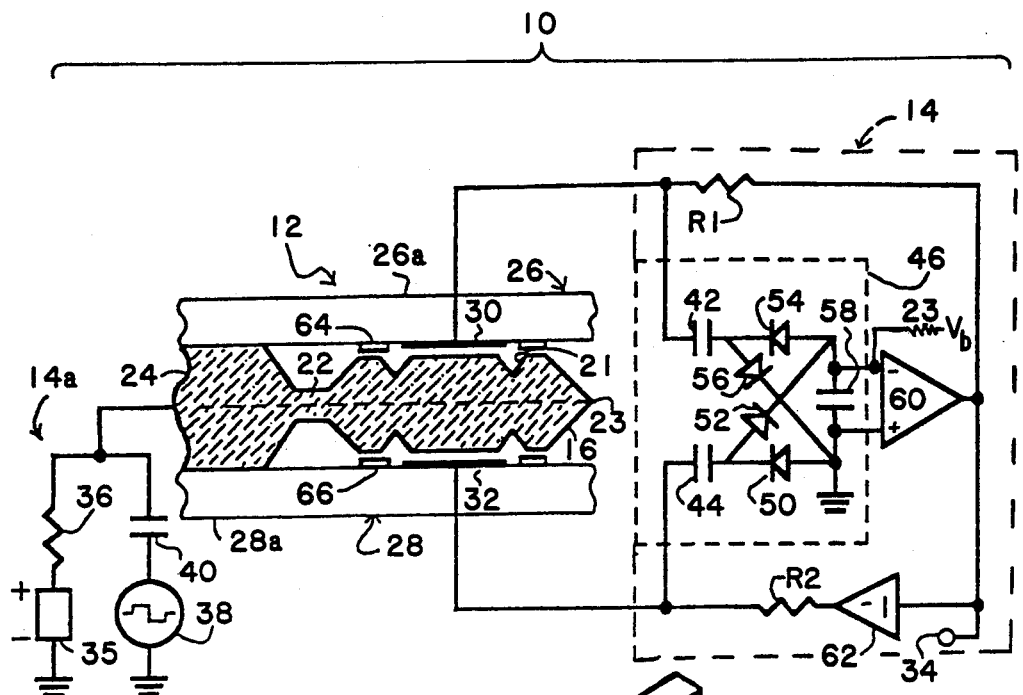
FIG. 1
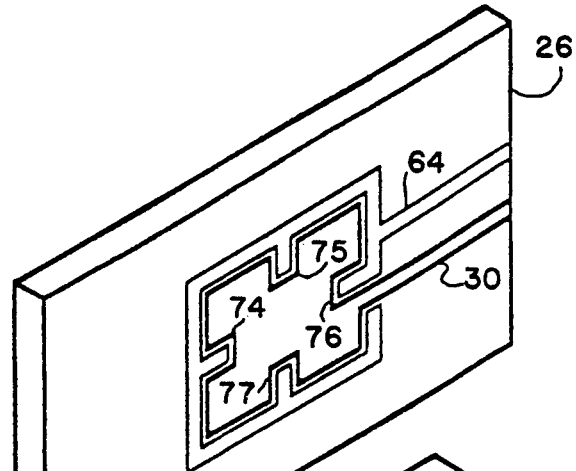
FIG. 2
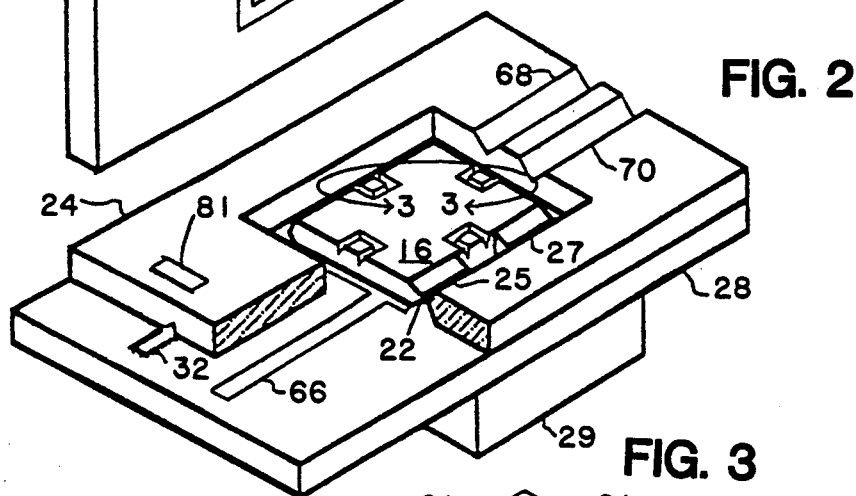
FIG. 3
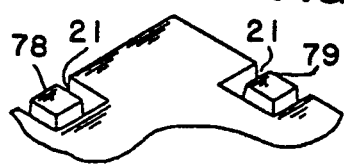

MINIATURE SILICON ACCELEROMETER AND METHOD

BACKGROUND OF THE INVENTION

This invention relates to miniature accelerometers for medium accuracy applications. There is a need for small and inexpensive accelerometers for use in tactical systems, such as the miniature accelerometers required in smart artillery and mortar operation where large stocks of rounds and accelerometers may be expended. A tactical accelerometer for such applications may be considered to be a medium quality instrument, but must have about five orders of magnitude dynamic range and be operable in a high vibration environment and over a wide temperature range.

SUMMARY OF THE INVENTION

It is a general object of the present invention to provide a miniature accelerometer, in an integrated circuit form, including a pair of electrode layers, a silicon proofmass suspended therebetween, and means responsive to differential capacitive coupling between the electrode layers and the proofmass for opposing acceleration forces applied thereto.

In a further aspect, the invention provides a method of sensing acceleration with a linear output while suspending a proofmass between a pair of electrode layers, sensing differential capacitive coupling between the electrode layers and the proofmass, and applying forces to the proofmass in response to the sensed coupling to oppose acceleration forces.

It is a further object of the present invention to increase the dynamic range of a miniature accelerometer by a factor of 100 to a 1000 over the previous state-of-the-art micromachined accelerometers which have had a dynamic range of about 100.

These and other features and advantages of this invention will become further apparent from the following detailed description with reference to the accompanying drawings, of which:

BRIEF DESCRIPTION OF THE DRAWINGS

FIG. 1 is an illustration of a miniature accelerometer constructed according to the present invention including a partial cross sectional view of an accelerometer transducer shown in combination with a schematic diagram of sensor circuitry.

FIG. 2 is an isometric view of the components of the accelerometer transducer of FIG. 1 shown with the upper part opened, and with portions of the lower part shown in cross section.

FIG. 3 is a top plan view of the region of the proofmass in the region 3—3 of FIG. 2.

DETAILED DESCRIPTION OF THE PREFERRED EMBODIMENTS

FIG. 1 shows the miniature accelerometer 10 of the present invention including a transducer 12 and circuitry 14 and 14a. The transducer 12 of accelerometer 10 is shown in partial cross sectional view and comprises proofmass 16 shown in the neutral position, midway between upper and lower electrodes 30 and 32. Proofmass 16 is formed of silicon suspended by a weak flexure 22 integrally formed from silicon layer 24. Flexure 22 defines a bend line along the mid-plane of proofmass 16, indicated by mid-plane axis 23 to minimize vibration rectification. By arranging the flexure to occur symmetrically about the mid-plane of the proofmass, shaking of the accelerometer will not induce a rectification so that the instrument will have high linearity.

Silicon layer 24 is anodically bonded between upper and lower glass layers 26 and 28 upon which have been deposited upper and lower metal electrodes 30 and 32, respectively, of aluminum or gold or other conductors. In addition, the top electrode glass layer and the bottom electrode glass layer are identical pieces, fabricated from the same mask first applied to the top, and then to the bottom layer to keep the symmetry exact. The proofmass is very symmetric so biases are not induced in the device. This also contributes to a high value of dynamic range with high linearity.

While electrodes 30 and 32 may conveniently be fabricated from evaporated aluminum, there is a certain moisture sensitivity inherently present in using aluminum because it adsorbs significant surface moisture which changes the dielectric properties of the surface and adds capacitance which is indistinguishable from other capacitances being measured. Accordingly, it is preferred to use a metal which does not absorb moisture, such as gold which may be conveniently sputter deposited. In order to keep the proofmass surface stable, it is also preferably coated with gold.

Accelerometer 10 functions as a force balance instrument in which the force of acceleration upon proofmass 16 is balanced by appropriate electrical restoring forces applied by sensor circuitry 14 through upper and lower forcer electrodes 30 and 32. The magnitude of the required restoring force is a function of the acceleration and may be measured at acceleration output 34 of sensor circuitry 14.

A DC bias is applied to proofmass 16 by a reference voltage source, such as stable semiconductor voltage reference source 35, through decoupling or AC isolating resistor 36.

In parallel, an AC signal generated by signal source 38 is coupled to proofmass 16 by coupling capacitor 40. Capacitors 42 and 44 couple the capacitances, formed between upper and lower electrodes 30 and 32 and proofmass 16, to differential bridge circuit 46 which includes diodes 50, 52, 54 and 56, filter capacitor 58 and high impedance, high gain operational amplifier 60. The output of amplifier 60 is used to directly drive upper electrode 30 and, after inversion by inverter 62, to drive lower electrode 32.

Acceleration output 34 is applied via amplifier 60 and inverter 62 to upper and lower electrodes 30 and 32 to apply electrostatic restoring forces to proofmass 16 to resist forces applied thereto by acceleration. Such electrostatic forces would normally be nonlinear, because they are proportional to the square of the applied voltage. The DC bias applied by stable voltage source 35, and the out-of-phase signals applied to upper and lower electrodes 30 and 32 from amplifier 60 and inverter 62, serve to remove this nonlinearity.

The forcer and proofmass voltage offset give a linear output with the electrostatic force feedback even though the basic forcer equations are nonlinear. The basic forcer equations are:

$$F_u = \frac{\epsilon_0 A V_u^2}{2 d_u^2} \text{ and } F_l = \frac{\epsilon_0 A V_l^2}{2 d_l^2} \tag{1}$$

where $F_u$ is the upper force, ($F_l$ is the lower force), A is the forcer electrode area, $V_u$ is the voltage between the upper forcer electrode and the proofmass, $V_l$ is the voltage between the lower electrode and the proofmass, and d is the electrode/proofmass spacing. By setting $$V_u = V_o - \Delta \text{ and } V_l = V_o + \Delta \qquad (2)$$

where $V_o$ is the voltage at 34 and $\Delta$ is a fixed voltage, e.g., 15 V, an exact linearization of the force equation is obtained, as shown by:

$$Ma = F_u - F_l = \frac{-2\epsilon_0 A \Delta}{d^2} V_0. \qquad (3)$$

where M is the mass of proofmass and a is the acceleration, so that the scale factor becomes:

$$-\frac{2\epsilon_0 A \Delta}{Md^2} \qquad (4)$$

$\Delta$ is the voltage generated by source 35. Thus, the output voltage at 34 is exactly proportional to acceleration when proofmass 16 is centered between upper and lower electrodes 30 and 32. The voltage may then be used as a measurement of the acceleration.

Linearization may also be achieved by having proofmass 16 at zero bias and applying a fixed bias voltage in series with amplifier output to upper electrode 30 while applying the same fixed bias voltage, with the opposite polarity, in series with amplifier output to lower electrode 32.

Remaining system nonlinearities due, for example, to imperfect centering of the proofmass in the gap, may be reduced by bias offsets applied to amplifier 60 from a voltage bias source $V_b$ through a large resistor (>250 k$\Omega$) R3. The use of such bias offsets permits the reduction of the effects of imperfect centering and vibration rectification essentially to zero.

In addition to upper and lower electrodes 30 and 32, upper and lower glass layers 26 and 28 may include upper and lower guard band electrodes 64 and 66. As shown in FIG. 1, and discussed further below with regard to FIG. 2, these guard band electrodes may be substantially thicker than upper and lower electrodes 30 and 32 to stand off proofmass 16 from upper and lower electrodes 30 and 32. This permits successful turn on of closed loop accelerometer 10 under acceleration without additional special circuitry.

The gaps on upper glass layer 26 between upper electrode 30 and upper guard band electrode 64 and, on lower glass layer 28 between lower electrode 32 and lower guard band electrode 66 may present special problems due to charging of the glass and leakage currents there across. When the potential on one such electrode is charged, the potential in the intervening insulator region or gap will also adjust from one value to another due to leakage currents on upper and lower glass layers 26 and 28. The potential distribution in these gaps changes as the insulation characteristics of these gaps change with humidity and other environmental conditions.

The potential in these gaps acts as an extension of the potential of upper or lower electrodes 30 and 32.

The electrostatic force effects of the potentials in these gaps is indistinguishable from the forces applied by upper and lower electrodes 30 and 32. The slowly changing potentials in the gaps therefore produce force transients at turn on and at acceleration changes.

By way of explanation consider the proofmass which sees only the forcer transducer electrode 30 and 32 of the upper and lower forces. However, the guard ring which is around the proofmass to prevent turn on problems is at a different potential from the electrodes 30 and 32. When the potential on electrodes 30 and 32 changes because of an acceleration change, the glass region between the electrodes 30 and 64 on the top or the glass region between electrode 32 and 66 on the bottom will have to change its potential as well. Glass between the main electrodes and the guard ring can be considered as a resistive material of very high resistance. If the potentials of electrodes 30 and 32 change, the region between these electrodes and their guard rings will change, but that change will be slow because of the high resistance of the glass.

The way to avoid having significant influence from the glass region between the electrodes is to make the main electrode 30 and electrode 32 much larger than the proofmass everywhere. However, the guard electrodes must be brought in at four small locations or fingers 74, 75, 76, 77, to touch the proofmass (FIGS. 2 and 3), should the proofmass be forced against the upper or lower glass layers. The electrode shape is arranged then such that the guard ring extends over the proofmass region only in these fingers. Otherwise, the glass region which is slow to charge is outside of the region where it can influence the proofmass. Nonetheless, the four fingers 74-77 do stick in and the effect of the glass in these regions around the four fingers is important. In order to reduce the effect of this glass region, a V-groove 21 is placed in the proofmass underneath the glass region so that if the charge on the glass varies slowly, it will have a minimum effect in forcing the proofmass to move because of the increased distance from the glass to the proofmass. Each groove 21 defines a post, 78 and 79 being shown in FIG. 3. The posts are there to contact the electrodes 64, 66 while keeping the electrodes 30, 32 clear of the proofmass when the device is started up under acceleration. The gap between the proofmass and the glass is no longer 3 microns in this area but is much larger, closer to 20 or 30 microns.

In this way, the acceleration transient response times are reduced or eliminated. As shown in greater detail in FIG. 3, trench or V-groove 21 is etched in proofmass 16 directly beneath the gaps between upper and lower electrodes 30 and 32 and upper and lower guard band electrodes 64 and 66 on upper and lower glass layers 26 and 28, respectively. V-groove 21 reduces the effect of the potential in the gaps on proofmass 16 by providing a large space therebetween, such as 10 times the normal spacing between upper glass layer 26 and proofmass 16. Upper and lower electrodes 30 and 32 may extend beyond proofmass 16 so that the effect of the fields from glass between upper electrode 30 and upper guard band electrode 64 and between lower electrode 32 and lower guard band electrode 66 are minimized. The top and bottom glass surfaces are metalized at 26a, 28a and connected to ground to shield the transducer from outside electric fields and from the influence of outside conductors.

Alternatively, a slightly conducting surface coating ($10^{10}$ ohms per square) may be placed on upper and lower glass layers 26 and 28, particularly in the gaps. The potential effects of the gaps would not be eliminated, but the potential distribution in the gap would be almost instantaneously established and held constant, permitting satisfactory acceleration sensing without unwanted transients as long as the resistance of the surface coating is high enough to not interfere with the sensing.

Referring now to FIG. 2, accelerometer transducer 12 is shown in a partially exploded isometric view in which upper glass layer 26 has been rotated into an open position and the remaining portion cut away for clarity. As noted above, upper electrode 30 has been fabricated on upper glass layer 26 by evaporation of aluminum or gold. Surrounding upper electrode 30 is upper guard band electrode 64. In a similar manner, a portion of lower guard band electrode 66 on lower glass layer 28 is visible through the partially cutaway portion of silicon layer 24. The end of lower electrode 32 is also visible.

Metallic bond pad 81 on silicon layer 24, electrically contacts this layer. Bond wires such as 1 mil gold or aluminum wire connect the ends of electrodes 32, 66, 30, and 64 and bond pad 81 to electrical circuit 14 and 14a. The bond wires are attached in one of several manners common to the integrated circuit industry.

Upper and lower guard band electrodes 64 and 66 may conveniently be fabricated with a double thickness layer of gold metalization, compared to the thickness of upper and lower electrodes 30 and 32. This additional thickness serves to stand proofmass 16 off from upper and lower electrodes 30 and 32 during turn on of accelerometer 10. Upper and lower guard band electrodes 64 and 66 are maintained at the same potential as proofmass 16.

As may be further seen in FIG. 2, upper and lower glass layers 26 and 28 may be designed to be identical to simplify fabrication. Wherever possible, transducer 12 has been designed and constructed symmetrically to reduce mechanical stresses and drift. The material used for upper and lower glass layers 26 and 28, such as 7740 brand borosilicate Pyrex glass, should be matched as closely as possible to that of proofmass 16 for thermal expansion. One can also use silicon with appropriate insulating layers for the top and bottom portions of the transducer sandwich.

Grooves 68 and 70 are positioned on the upper surface of silicon layer 24 as shown to insure isolation of upper electrode 30 and upper guard band electrode 64 from contact with silicon layer 24 while similar insulating grooves, not visible in this view, are positioned on the lower surface of silicon layer 24 to insulate lower guard band electrode 66 and lower electrode 32 from electrical contact with silicon layer 24.

Proofmass 16 is visible in the partial cutaway view, connected to silicon layer 24 by flexure 22. Flexure 22 may be constructed from a single hinge connection but, as shown, it is preferable to utilize a symmetrically balanced split flexure, such as that formed by hinges 25 and 27, to minimize proofmass offsets due to bending of accelerometer transducer 12. A minimum strength is required in flexure 22 to resist breakage due to forces in the plane of the silicon and to resist an electrostatic cocking instability.

The construction of accelerometer transducer 12, including proofmass 16 and flexure 22, may be accomplished with available integrated circuit and micromachining fabrication technologies. Various controlled etch techniques are available for forming proofmass 16 from surrounding silicon layer 24, leaving a limited physical connection therebetween to form flexure 22.

Flexure 22 may be annealed at high temperature, such as 1000° C. for several hours, to reduce any non-uniform stresses resulting during fabrication from high doping gradients and/or concentrations. Upper and lower glass layers 26 and 28 are anodically bonded to silicon layer 24 simultaneously to prevent warpage.

The upper and lower surfaces of proofmass 16 must be formed by etching away the surfaces of silicon layer 24 so that the appropriate gaps, on the order of about 2 μm, will be created between proofmass 16 and upper and lower glass layers 26 and 28.

The outer surfaces of glass layers 26a and 28a are preferably metalized with a conductive coating so that during use, this outer metalization may be connected to a well defined potential, such as the system ground, and shield the internal structures from the effects of external electric fields which might otherwise cause errors.

The transducer can be mounted on a pad 29 of resilient material, as shown in FIG. 2, to reduce stresses from a mounting surface which may have a different expansion characteristic and to reduce vibration transmission from such a mounting surface. The pad 29 prevents warpage of the transducer being caused by differential thermal expansion with respect to the material of the package or by mechanical distortions of the package during use. If allowed, such warpage would introduce small errors into the transducer so limiting its dynamic range. The resilient pad is preferably made electrically conductive by loading with an appropriate material, such as carbon-black or silver powder, permitting easy electrical contact to the lower metalized surface of layer 28.

Sensor circuitry 14 may conveniently be formed by conventional integrated circuit fabrication techniques as part of the same physical package as accelerometer transducer 12. Accelerometer transducer 12 and sensor circuitry 14 may be packaged within the same hermetically sealed flat pack or other convenient hybrid package.

During operation, if there is any imbalance in the capacitances between proofmass 16 and upper and lower electrodes 30 and 32 when proofmass 16 is centered, sensor circuitry 14 will balance the capacitances by applying electromotive forces to proofmass 16 to move it to an off centered position and hold it there. This off-center positioning will produce a second order nonlinearity unless compensated by the application of an appropriate bias offset to amplifier 60 or a compensation capacitance added between 16 and 30 or between 16 and 32.

With reference again to FIG. 1, a signal source 38 may be, for example, a 4 volt peak to peak AC source, such as a square wave source operating at say, 10 MHz. This AC signal, together with the appropriate DC bias from reference source 35, is applied to silicon layer 24 and therefore to proofmass 16. If proofmass 16 is in its neutral position, the AC signal is coupled equally to upper and lower electrodes 30 and 32. The capacitive pickup between proofmass 16 and upper and lower electrodes 30 and 32 is compared in differential bridge circuit 46.

It is important to note that capacitors 42 and 44 are large compared to the capacitance formed between upper and lower electrodes 30 and 32 and proofmass 16 and thus have negligible effect on the neutral position of proofmass 16. In the neutral position, the values are balanced and no differential signal is applied to amplifier 60 so no differential DC signal is applied thereby to upper and lower electrodes 30 and 32.

These electrodes pick up an rf signal namely a 10 megahertz signal from generator 38 coupled through the appropriate gaps from the proofmass to 30 and from the proofmass to 32.

To trace the signal flow, the AC signal from 38 is coupled to the proofmass where it is further coupled across the air gaps to 30 and 32. Following the path from 30, the signal sees on one hand, the resistor R1, of relatively high impedance, between 10 and 30 kilo ohms, isolating it from amplifier 60, and capacitor 42 which is a large capacitor allowing it to easily pass to the diode quad bridge. On the other hand, the dc feedback signal which comes from amplifier 60 goes along the path to resistor R1. Since there is very little dc current drawn, there is negligible dc voltage drop across R1, from which the dc signal is applied directly to electrode 30. Capacitor 42 serves to block the dc signal from the diode quad bridge. Similarly the same arguments apply to the effect of resistor R2 and capacitor 44.

In operation, acceleration causes relative motion between proofmass 16 and upper and lower electrodes 30 and 32 as proofmass 16 attempts to pivot about flexure 22. As proofmass 16 moves and approaches one electrode, such as lower electrode 32, the increased capacitive pickup of the AC signal from signal source 38 causes a voltage to be applied to amplifier 60 via differential bridge circuit 46. The resultant increased DC signal voltage applied to lower electrode 32 via inverter 62 and the decreased voltage applied to upper electrode 30 from amplifier 60 serves to apply an electrostatic force to proofmass 16 to resist the force of acceleration and restore proofmass 16 to its neutral position. The decreased signal applied to inverter 62 may be monitored at acceleration output 34 and is proportional to the acceleration force resisted.

For sufficiently high gain of amplifier 60, there is a negligible departure of proofmass 16 from its nominal position in the gap when acceleration is applied, thus assuring linearity. In order to maintain stability of the response of closed loop accelerometer 10 with high gain amplifier 60, it is necessary to provide a roll off of the high gain at high frequencies. One particularly advantageous mechanism for achieving high frequency gain roll off is to provide viscous damping by for example, the use of a gas or liquid in the gap between upper and lower electrodes 30 and 32 and proofmass 16 as shown in FIG. 1.

Thus, there has been provided a novel miniature accelerometer design and method micromachined in silicon which has among other features a large dynamic range with an excellent ratio of full scale to accuracy. The design is highly symmetric. In particular, the hinge is in the center plane of the proofmass, and the structure is balanced to prevent warpage. This gives good bias stability to range ratio. The design is closed loop with an exceptionally high loop gain and a very weak hinge compared with the pendulosity and electrostatic forces. This also gives good bias stability to range ratio. The differential forcing with offset works in conjunction with the high loop gain to minimize non-linearity errors and vibro-pendulosity errors.

Secondary perturbation, which can give bias errors, have been eliminated in the present design by a number of features herein disclosed including 1) electrostatic shielding the outside of the chip 2) extending the electrodes to minimize fringing fields 3) choosing electrode metals for surface stability at atomic levels i.e. lacking hygroscopic or oxide growth potential 4) etching grooves to reduce the effect of residual fringing 5) use of a resistive coating to stabilize charge distribution in electrode gaps 6) splitting the hinge to reduce the effect of structural warpage 7) use of a resilient mount to prevent structural warpage as a result of differential expansion or other external forces.

Additionally, the present invention simplifies the servo operation of the accelerometer by applying the excitation to the proofmass, and by arranging the construction so that the pick off and forcer electrodes are now the same.

While this invention has been described with reference to its presently preferred embodiments, its scope is not limited thereto. Rather, such scope is only limited insofar as defined by the following set of claims and all equivalents thereof.

What is claimed is:

1. A miniature accelerometer, comprising:
   a pair of spaced insulating layers;
   a pair of electrodes disposed on said insulating layers;
   a silicon proofmass assembly including a proofmass and a mounting;
   means for suspending said proofmass from the mounting between said electrodes with a gap between each electrode and said proofmass;
   means for applying an AC excitation signal directly to said proofmass;
   means for detecting AC signals coupled to said electrodes therefrom; and
   means responsive to the AC signals detected for applying acceleration opposing forces to said proofmass.

2. The miniature accelerometer as in claim 1 further including:
   means for applying a bias offset to said electrical signal to reduce the effects of imperfect centering of the proofmass and vibration rectification.

3. The miniature accelerometer claimed in claim 1, wherein the means responsive to the AC signals detected further comprises:
   means for applying differential electrostatic forces between the electrodes and the proofmass linearly proportional to the detected AC signals.

4. The miniature accelerometer claimed in claim 3, wherein the means for applying electrostatic forces, further comprises:
   means for applying differential DC voltages between the electrodes and the proofmass proportional to the detected AC signals; and
   means for applying DC bias voltages between the electrodes and the proofmass to make the electrostatic forces applied there between linearly proportional to acceleration.

5. The miniature accelerometer claimed in claim 1, wherein the proofmass is a portion of a silicon layer sealed between said insulating layers.

6. The miniature accelerometer claimed in claim 5, wherein said proof mass defines a mid plane and further wherein the silicon layer further includes
   a flexure operating at the midplane of said proofmass for the purpose of suspending the proofmass.

7. The accelerometer as in claim 6 wherein said flexure is formed in a split construction using symmetrically balanced hinges.

8. The miniature accelerometer claimed in claim 5, further comprising:
a thin film of gas or liquid in the gap between the proofmass and the electrodes to provide viscous damping therebetween.

9. A miniature accelerometer, comprising:
a pair of spaced electrodes deposited on a pair of spaced insulating layers made of material having thermal expansion coefficient closely matched to silicon;
a silicon proofmass;
means for suspending said proofmass between said electrodes;
bias linear means including an amplifier responsive to differential capacitive coupling between the electrodes and the proofmass for generating an electrical signal for opposing acceleration forces applied thereto;
means for measuring a change in the value of said signal as a measure of said acceleration;
said electrodes including forcer electrode means for applying electrostatic forces to the proofmass in response to and for opposing acceleration forces applied thereto; and
guard electrode means for preventing contact between the forcer electrode means and the proofmass.

10. A miniature accelerometer, comprising:
a pair of spaced electrodes deposited on a pair of spaced insulating layers made of material having thermal expansion coefficient closely matched to silicon;
a silicon proofmass;
means for suspending said proofmass between said electrodes;
bias linear means including an amplifier responsive to differential capacitive coupling between the electrodes and the proofmass for generating an electrical signal for opposing acceleration forces applied thereto;
means for measuring a change in the value of said signal as a measure of said acceleration;
a forcer electrode metalization for applying an electrostatic force to the proofmass; and
a guard electrode metalization, substantially thicker than the forcer electrode metalization, for preventing contact between the forcer electrode metalization and the proofmass.

11. The miniature accelerometer claimed in claim 10, further comprising:
means for reducing transient electrostatic force changes resulting from differences in potential between the guard and forcer electrode metalizations.

12. The miniature accelerometer claimed in claim 11, wherein the means for reducing transient electrostatic force changes further comprises:
groove means in the proofmass opposite the portion of the electrode layer between the forcer and guard electrode metalizations for reducing the effects of electrostatic forces applied to the proofmass therefrom.

13. The miniature accelerometer claimed in claim 11, wherein the means for reducing transient electrostatic force changes further comprises:
resistive coating means on the portion of the insulating layers between the forcer and guard electrode metalizations for maintaining a well defined potential distribution therebetween.

14. The accelerometer as in claim 13 further including:
conductor metalization layers deposited on the outermost surfaces of the insulating layers to shield the electrodes and proofmass from external electric fields.

15. A method of sensing acceleration using a proofmass and electrodes disposed on spaced insulating layers to form an accelerometer,
suspending the proofmass in a balanced position between the electrodes to define equal coupling capacitances between the electrodes and the proofmass,
electronically sensing differential capacitive coupling between the electrodes and the proofmass whenever the proofmass is moved away from a balanced position due to acceleration,
electronically generating an electrical signal which, when applied to the electrodes, generates an electrostatic force on the proofmass which will tend to move the proofmass toward said balanced position,
applying said electrical signal to said electrodes to create acceleration opposing forces to be applied to the proofmass, and
applying an electrostatic force from a forcer electrode to the proofmass;
preventing contact between the forcer electrode and the proofmass with a guard electrode, and
measuring the magnitude and sign of said electrical signal required to restore said balance as a measure of the acceleration experienced by the proofmass.

16. The method of sensing acceleration claimed in claim 15, further comprising:
reducing transient electrostatic force changes resulting from differences in potential between the forcer and guard electrodes.

17. The method of sensing acceleration claimed in claim 16, wherein the transient reduction step further comprises:
increasing the distance between the proofmass and the portion of the insulating layers between the forcer and guard electrodes.

18. The method of sensing acceleration claimed in claim 16, wherein the transient reduction step further comprises:
applying a resistive coating to the portion of the insulating layers between the forcer and guard electrodes to maintain a constant potential distribution there between.

19. A miniature accelerometer, comprising:
a pair of insulating layers having metalized electrodes thereon;
a silicon proofmass suspended between the layers;
means for applying an A.C. signal directly to the proofmass;
means responsive to the induced signal in the electrodes for detecting AC signals coupled to the electrodes therefrom; and
means responsive to the AC signals detected for applying differential electrostatic forces between the electrodes and the proofmass linearly proportional to the detected AC signals.

20. The accelerometer claimed in claim 19, wherein the metalized electrodes extend beyond the proofmass.

21. The accelerometer claimed in claim 19, further comprising:
 means for resiliently mounting the accelerometer.

22. A miniature accelerometer, comprising:
 a pair of electrode layers;
 a silicon proofmass suspended therebetween;
 guard electrode means for preventing contact between the proofmass and the electrode layers; and
 means responsive to differential capacitive coupling between the electrode layers and the proofmass for opposing acceleration forces applied thereto.

* * * * *